(12) United States Patent
Chang

(10) Patent No.: US 9,521,888 B2
(45) Date of Patent: Dec. 20, 2016

(54) PROTECTIVE COVER AND ELECTRONIC DEVICE HAVING SAME

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 209 days.

(21) Appl. No.: 14/549,773

(22) Filed: Nov. 21, 2014

(65) Prior Publication Data

US 2015/0144669 A1 May 28, 2015

(30) Foreign Application Priority Data

Nov. 22, 2013 (CN) .......................... 2013 1 0592880

(51) Int. Cl.
*A45C 11/00* (2006.01)
*H04B 1/3888* (2015.01)

(52) U.S. Cl.
CPC ............. *A45C 11/00* (2013.01); *H04B 1/3888* (2013.01); *A45C 2011/002* (2013.01)

(58) Field of Classification Search
CPC .. A45C 11/00; A45C 2011/002; H04B 1/3888
USPC ........................... 361/749; 224/230; 220/241
See application file for complete search history.

(56) References Cited

U.S. PATENT DOCUMENTS

| 2014/0055927 | A1* | 2/2014 | Wang | ....................... H05K 7/00 361/679.01 |
| 2014/0268517 | A1* | 9/2014 | Moon | ....................... H05K 7/00 361/679.01 |
| 2014/0323182 | A1* | 10/2014 | Kim | ....................... H04B 1/3888 455/566 |

OTHER PUBLICATIONS

STIC Search Report.*

* cited by examiner

*Primary Examiner* — Dion R Ferguson
*Assistant Examiner* — Mandeep S Buttar
(74) *Attorney, Agent, or Firm* — Zhigang Ma

(57) ABSTRACT

A protective cover includes a main body, a lid, and a touch unit. The main body receives a handheld electronic device. The lid is pivotally connected to the main body via a connection plate. The lid includes a touch panel. The touch unit is mounted inside the lid and the connection plate. The touch unit is configured to calculate touch track of the touch panel and transmit a touch signal to the handheld electronic device.

20 Claims, 4 Drawing Sheets

PROTECTIVE COVER AND ELECTRONIC DEVICE HAVING SAME

FIELD

The subject matter herein generally relates to a protective cover and an electronic device having the protective cover.

BACKGROUND

With ongoing developments in electronic technology, electronic devices, such as mobile phones, table computers, video player, MP3 player, or personal digital assistants (PDAs), have become widely used in a variety of occasions. When an impact force acts upon on the electronic devices, for example, the electronic devices fall down, the electronic devices are easily damaged. For protection of the electronic devices, protective covers are provided around the periphery of the electronic devices.

BRIEF DESCRIPTION OF THE DRAWINGS

Implementations of the present technology will now be described, by way of example only, with reference to the attached figures.

DETAILED DESCRIPTION

Figure 1:
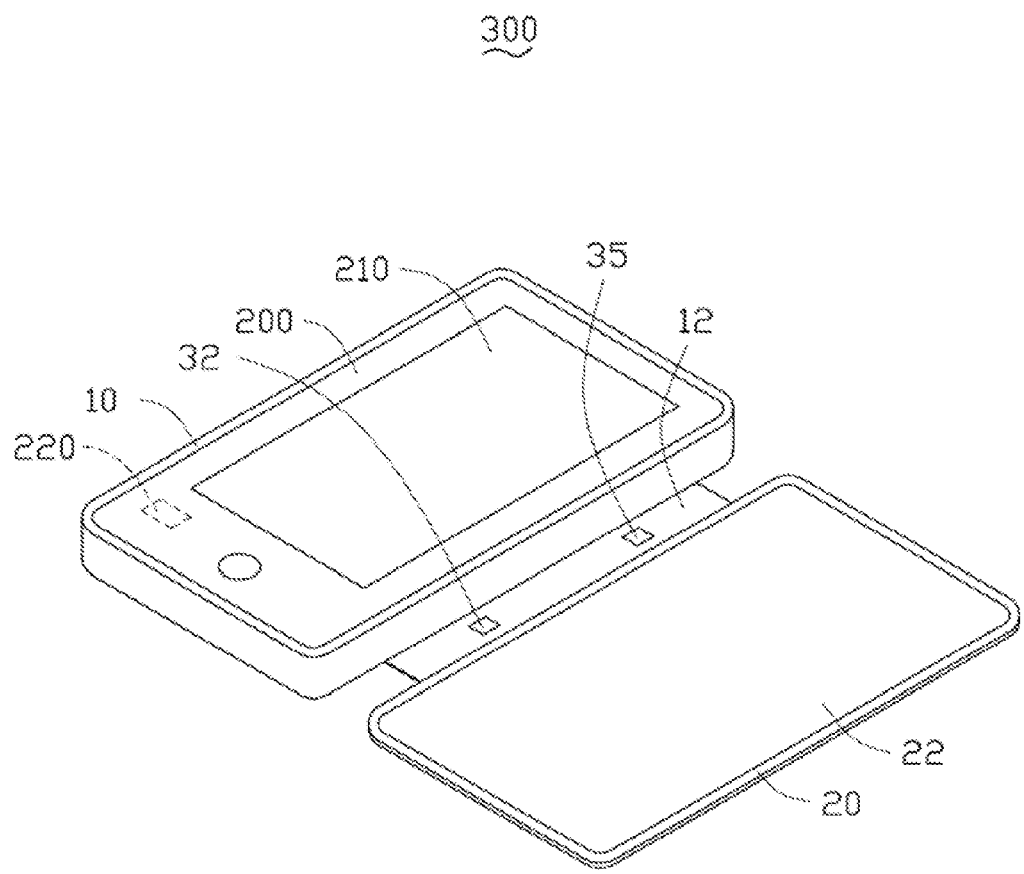
FIG. 1 is an isometric view of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is being modified such that exactness does not apply. For example, "substantially cylindrical" means that the object resembles a cylinder, but can have one or more deviations from a true cylinder. The term "comprising," means "including, but not necessarily limited to" and specifically indicates open-ended inclusion or membership in the so-described combination, group, series and the like. The references "a plurality of" and "a number of" mean "at least two."

The present disclosure is described in relation to a protective cover. The protective cover includes a main body, a lid, and a touch unit. The main body receives a handheld electronic device. The lid is pivotally connected to the main body via a connection plate. The lid includes a touch panel. The touch unit is mounted inside the lid and the connection plate. The touch unit is configured to calculate touch track of the touch panel and transmit a touch signal to the handheld electronic device, thereby making the handheld electronic device execute orders according to the touch signal.

The present disclosure is described in relation to an electronic device. The electronic device includes protective cover and a handheld electronic device. The protective cover includes a main body, a lid, and a touch unit. The main body receives a handheld electronic device. The lid is pivotally connected to the main body via a connection plate. The lid includes a touch panel. The touch unit is mounted inside the lid and the connection plate. The touch unit is configured to calculate touch track of the touch panel and transmit a touch signal to the handheld electronic device, thereby making the handheld electronic device execute orders according to the touch signal.

FIG. 1 illustrates an example embodiment of an electronic device 300. The electronic device 300 includes a protective cover 100 and a handheld electronic device 200 received in the protective cover 100.

Figure 2:
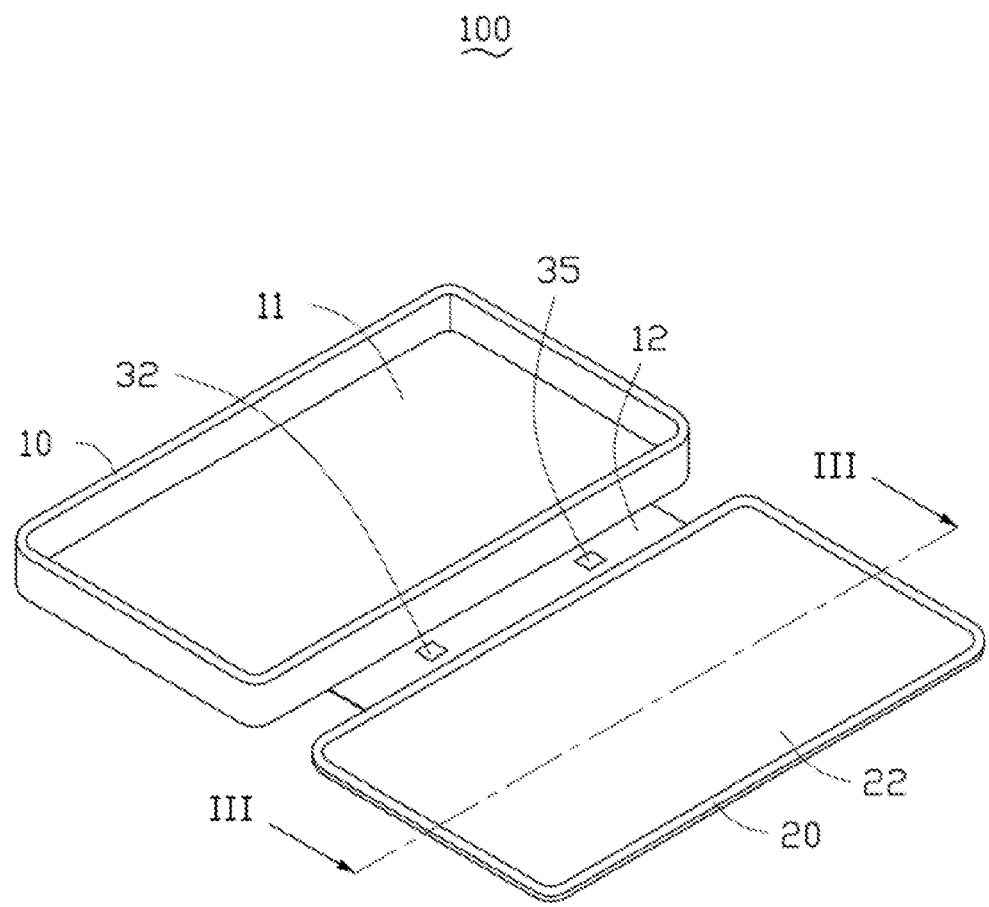
FIG. 2 is an isometric view of a protective cover of the electronic device of FIG. 1.

FIG. 2 illustrates that the protective cover 100 can include a main body 10, a lid 20 pivotally connected to the main body 10, and a touch unit 30.

The main body 10 includes a base plate 11 and a side wall 13. The base plate 11 includes a lower surface 110 and an upper surface 112. The lower surface 110 and the upper surface 112 are positioned at opposite sides of the base plate 11. The side wall 13 is a closed ring and perpendicularly extends up from the upper surface 112. The base plate 11 cooperates with the side wall 13 to form a receiving room 10a for receiving the handheld electronic device 200. The lid 20 is connected to the side wall 13 via a connection plate 12. In this embodiment, the connection plate 12 is a flexible printed circuit board. One end of the connection plate 12 is connected to the side wall 13, and the other end of the connection plate 12 is connected to the lid 20. The connection plate 12 allows the lid 20 to rotate about the side wall 13. In detail, the lid 20 can be rotated to contact the top of the side wall 13 to seal the receiving room 10a. The lid 20 can be rotated to be coplanar with the base plate 11 as shown in FIG. 2. The lid 20 also can be rotated to contact to the lower surface 110.

Figure 3:
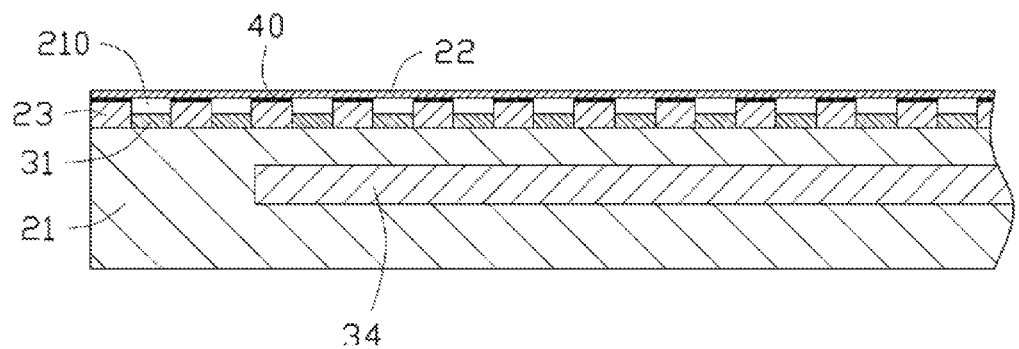
FIG. 3 is a cross-sectional view taken along line III-III of the protective cover of FIG. 2.

FIGS. 2-3 illustrate that the lid 20 includes a substrate 21, a touch panel 22, and a plurality of elastic support stripes 23 sandwiched between the substrate 21 and the touch panel 22. In this embodiment, the substrate 21 is a printed circuit board and is electrically connected to the connection plate 12. The support stripes 23 are made of rubber and are arranged in a crisscross pattern on the substrate 21. The touch panel 22 is mounted on the support stripes 23 via adhesive 40. That is, the substrate 21 and touch panel 22 are positioned at opposite sides of each support stripe 23. The substrate 21, the support stripes 23, and the touch panel 22 cooperatively form a plurality of cavities 210. The cavities 210 are arranged in an array and are full of gas. In this embodiment, the gas is nitrogen. The touch panel 22 is made of plastic film which can be deformed if touched.

In this embodiment, the main body 10, the lid 20, and the handheld electronic device 200 are substantially rectangular. In other embodiments, the main body 10, the lid 20, and the handheld electronic device 200 can be circular, triangular, or other shaped.

Figure 4:
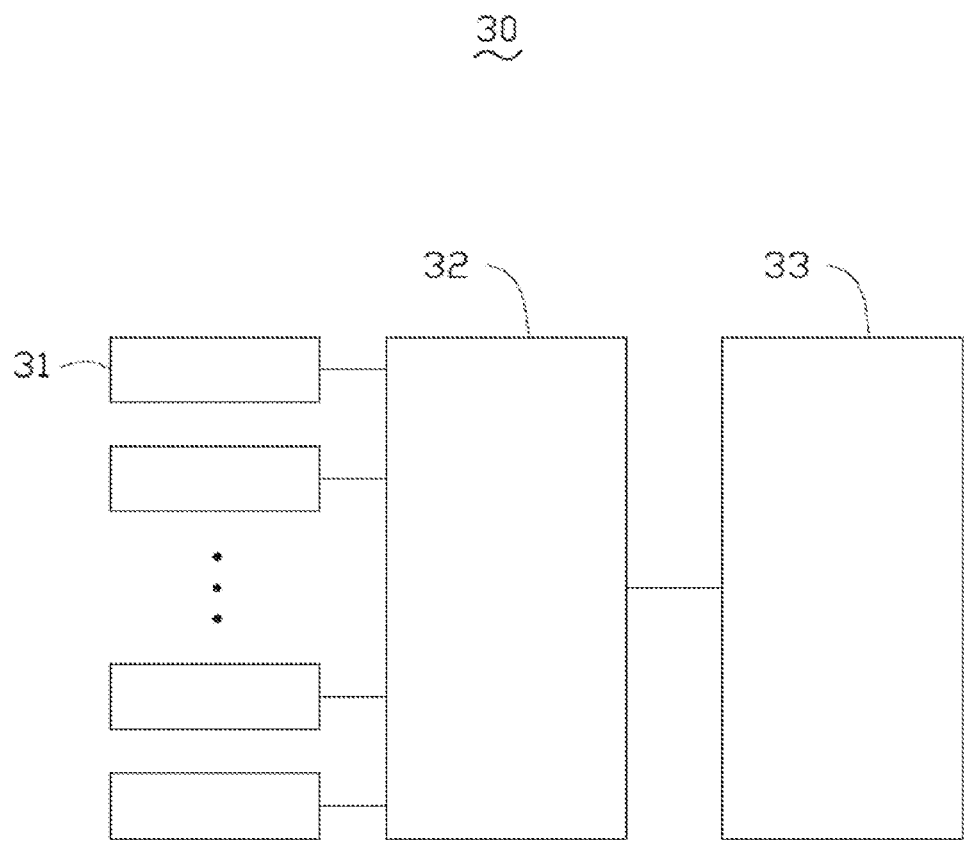
FIG. 4 is a diagrammatic view of a touch unit of the protective cover of FIG. 2.

FIGS. 3-4 illustrate that the touch unit 30 includes a plurality of pressure sensors 31, a processor 32, and a wireless communication module 33.

The pressure sensors 31 are received in the cavities 210 and mounted on the substrate 21. The pressure sensors 31 are electrically connected to the connection plate 12 via the substrate 21. In this embodiment, each of the pressure sensor 31 is a micro-electromechanical systems pressure sensor.

FIG. 2 illustrates that the processor 32 is embedded in the connection plate 12. The processor 32 is electrically connected to the connection plate 12 and the substrate 21, such that the processor 32 is electrically connected to the pressure sensors 31. The processor 32 is configured to store positions of the pressure sensors 31 on the substrate 21, and to calculate the touch track of the touch panel 22 according to a time order of pressure values detected by the pressure sensors 31 and the positions of the pressure sensors 31, and output a touch signal.

In this embodiment, the wireless communication module 33 is mounted inside the lid 20 and is a near field communication (NFC), such as Bluetooth. The wireless communication module 33 is configured to transmit the touch signal to the handheld electronic device 200, such that the handheld electronic device 200 can be controlled by means of touching the touch panel 22.

The touch unit 30 also includes a battery module 34 and a power manager 35. The battery module 34 is a thin cell and is embedded in the substrate 21. The power manager 35 is mounted inside the connection plate 12. The power manager 35 is electrically connected to the battery module 34, the pressure sensors 31, the processor 32, and the wireless communication module 33. The power manager 35 is configured to control the battery module 34 to supply power to the pressure sensors 31, the processor 32, and the wireless communication module 33.

The handheld electronic device 200 is received in the receiving room 10a and includes a display screen 210 exposed at the receiving room 10a. The handheld electronic device 200 can be, but is not limited to, a mobile phone, a tablet computer, a video player, a smart phone, a walkie-talkie, and a navigation device. In this embodiment, the handheld electronic device 200 is a tablet computer. The handheld electronic device 200 includes a receiver 220 mounted inside thereof. The receiver 220 is configured to communicate with the wireless communication module 33 to receive the touch panel 22 from the wireless communication module 33.

When in use, the handheld electronic device 200 and the touch unit 30 are activated. A cursor is shown in the display screen 210. The touch panel 22 is touched by a user, the processor 32 calculates the touch track of the touch panel 22 according to the time order of pressure values detected by the pressure sensors 31 and the positions of the pressure sensors 31, and output a touch signal. The wireless communication module 33 transmits the touch signal to the receiver 220 of the handheld electronic device 200. The cursor follows the touch track according to the touch signal. Accordingly, the handheld electronic device 200 executes orders according to the touch signal.

The embodiments shown and described above are only examples. Many details are often found in the art such as the other features of a protective cover and an electronic device having the protective cover. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A protective cover comprising:
a main body for receiving a handheld electronic device;
a lid pivotally connected to the main body via a connection plate, and comprising a touch panel; and
a touch unit mounted inside the lid and the connection plate, and the touch unit configured to calculate a touch track of the touch panel and transmit a touch signal to the handheld electronic device.

2. The protective cover of claim 1, wherein the main body comprises a base plate and a side wall extending up from the base plate, the base plate cooperates with the side wall to form a receiving room, and the handheld electronic device is received in the receiving room.

3. The protective cover of claim 2, wherein the side wall is a closed ring.

4. The protective cover of claim 1, wherein the connection plate is a flexible printed circuit board.

5. The protective cover of claim 1, wherein the lid comprises a substrate, a touch panel, and a plurality of elastic support stripes sandwiched between the substrate and the touch panel, the substrate, the support stripes, and the touch panel cooperatively form a plurality of cavities filling gas, the touch unit comprises a plurality of pressure sensors received in the cavities and mounted on the substrate, a processor embedded in the connection plate and electrically connected to the connection plate and the pressure sensors, and a wireless communication module mounted inside the lid, the processor is configured to store positions of the pressure sensors on the substrate, and to calculate the touch track of the touch panel according to a time order of pressure values detected by the pressure sensors and the positions of the pressure sensors, and output the touch signal, and the wireless communication module is configured to transmit the touch signal to the handheld electronic device.

6. The protective cover of claim 5, wherein the substrate is a printed circuit board.

7. The protective cover of claim 5, wherein the support stripes are made of rubber.

8. The protective cover of claim 5, wherein the support stripes are arranged in a crisscross pattern on the substrate.

9. The protective cover of claim 5, wherein the touch panel is mounted on the support stripes via adhesive.

10. The protective cover of claim 5, wherein the touch unit further comprises a battery module embedded in the substrate and a power manager mounted inside the connection plate, the power manager is electrically connected to the battery module, the pressure sensors, the processor, and the wireless communication module, the power manager is configured to control the battery module to supply power to the pressure sensors, the processor, and the wireless communication module.

11. An electronic device comprising:
a handheld electronic device; and
a protective cover comprising:
a main body for receiving the handheld electronic device;

a lid pivotally connected to the main body via a connection plate, the lid comprising a touch panel; and a touch unit mounted inside the lid and the connection plate, and the touch unit configured to calculate touch track of the touch panel and transmit a touch signal to the handheld electronic device.

12. The electronic device of claim 11, wherein the main body comprises a base plate and a side wall extending up from the base plate, the base plate cooperates with the base plate to form a receiving room, and the handheld electronic device is received in the receiving room.

13. The electronic device of claim 12, wherein the side wall is a closed ring.

14. The electronic device of claim 11, wherein the connection plate is a flexible printed circuit board.

15. The electronic device of claim 11, wherein the lid comprises a substrate, a touch panel, and a plurality of elastic support stripes sandwiched between the substrate and the touch panel, the substrate, the support stripes, and the touch panel cooperatively form a plurality of cavities filling gas, the touch unit comprises a plurality of pressure sensors received in the cavities and mounted on the substrate, a processor embedded in the connection plate and electrically connected to the connection plate and the pressure sensors, and a wireless communication module mounted inside the lid, the processor is configured to store positions of the pressure sensors on the substrate, and to calculate the touch track of the touch panel according to a time order of pressure values detected by the pressure sensors and the positions of the pressure sensors, and output the touch signal, and the wireless communication module is configured to transmit the touch signal to the handheld electronic device.

16. The electronic device of claim 15, wherein the substrate is a printed circuit board.

17. The electronic device of claim 15, wherein the support stripes are made of rubber.

18. The electronic device of claim 15, wherein the support stripes are arranged in a crisscross pattern on the substrate.

19. The electronic device of claim 15, wherein the touch panel is mounted on the support stripes via adhesive.

20. The electronic device of claim 15, wherein the touch unit further comprises a battery module embedded in the substrate and a power manager mounted inside the connection plate, the power manager is electrically connected to the battery module, the pressure sensors, the processor, and the wireless communication module, the power manager is configured to control the battery module to supply power to the pressure sensors, the processor, and the wireless communication module.

* * * * *